(No Model.) 2 Sheets—Sheet 1.
D. J. McCALL.
COMBINED CULTIVATOR AND COTTON AND CORN PLANTER.
No. 278,810. Patented June 5, 1883.
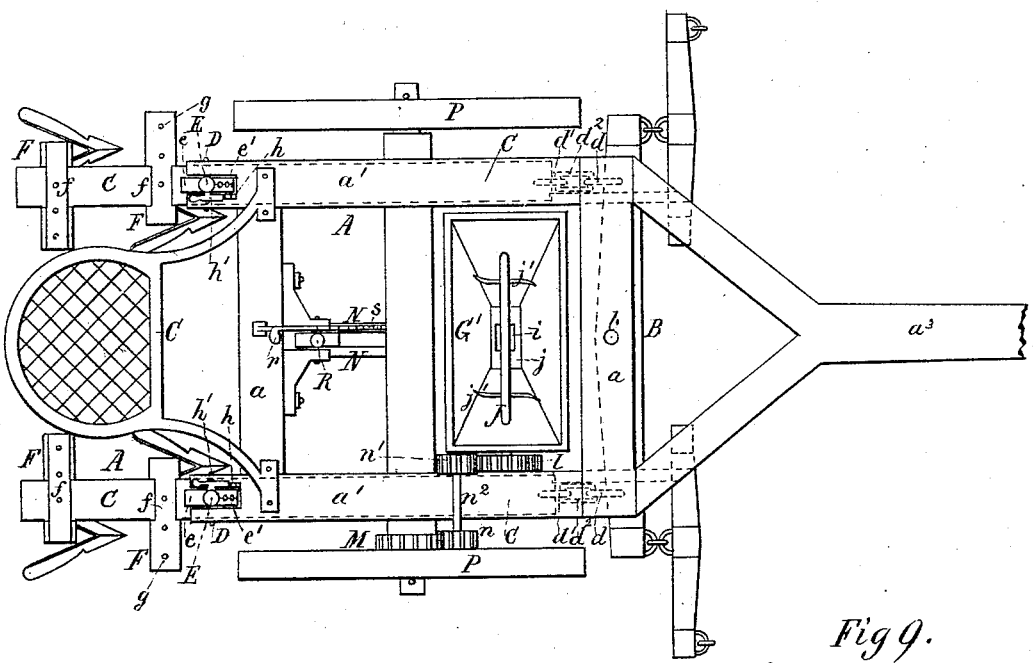
Fig 1.
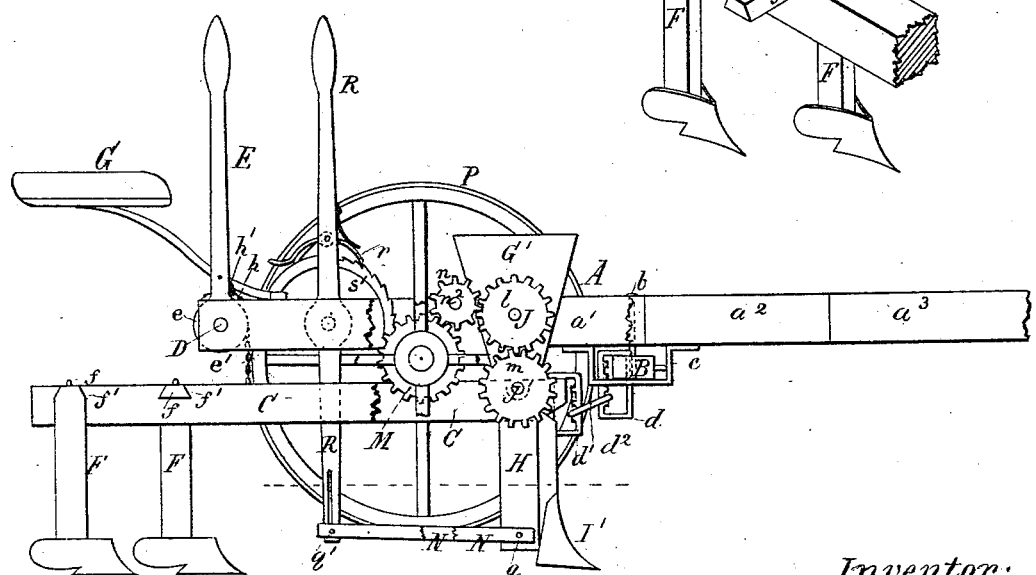
Fig 2. Fig 9.
Fig 8.
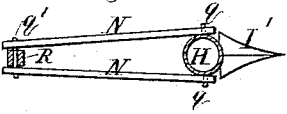
Witnesses:
J. P. Theo. Lang.
Robt. L. Fenwick.
Inventor:
Duncan J. McCall
by his attys
Fenwick & Lawrence
N. PETERS, Photo-Lithographer, Washington, D. C.

(No Model.) 2 Sheets—Sheet 2.
D. J. McCALL.
COMBINED CULTIVATOR AND COTTON AND CORN PLANTER.
No. 278,810. Patented June 5, 1883.
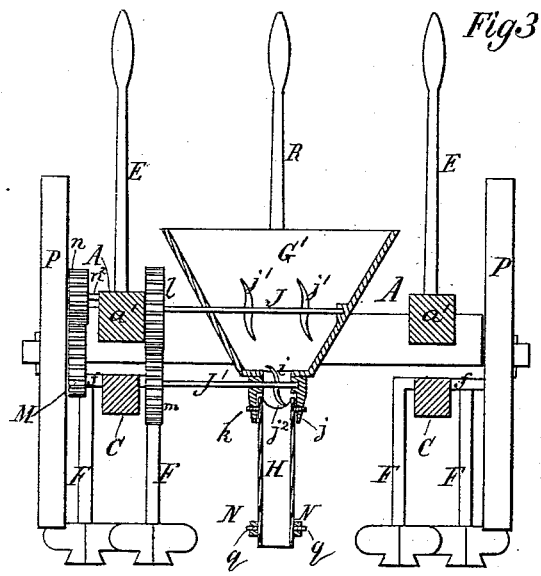
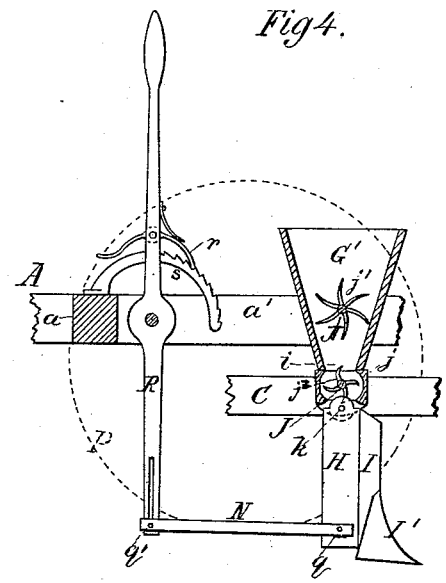
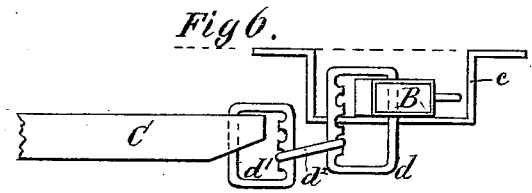
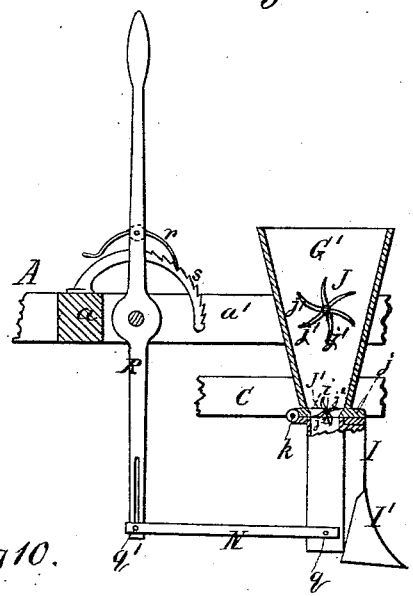
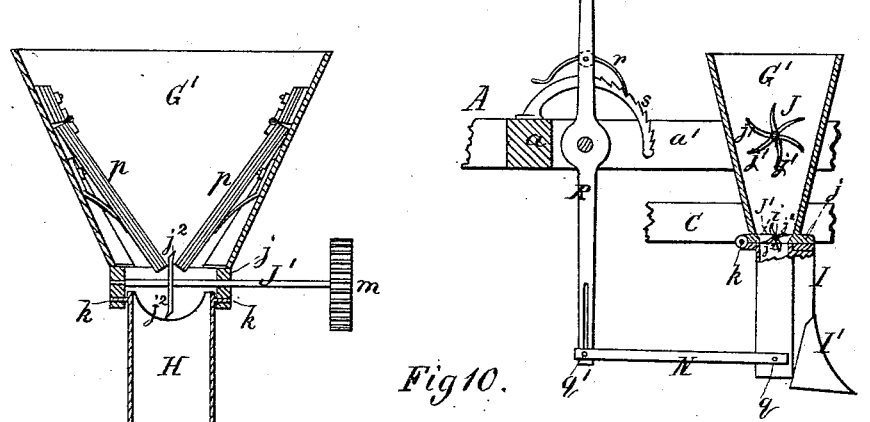
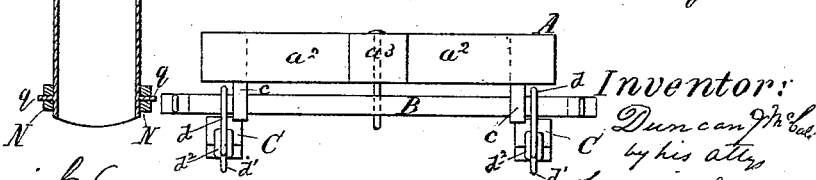
Witnesses:
J. P. Theo. Lang
Robt. L. Fenwick
Inventor:
Duncan J. McCall
by his attys
Fenwick & Lawrence

UNITED STATES PATENT OFFICE.

DUNCAN J. McCALL, OF CAMERON, TEXAS.

COMBINED CULTIVATOR AND COTTON AND CORN PLANTER.

SPECIFICATION forming part of Letters Patent No. 278,810, dated June 5, 1883.

Application filed November 13, 1882. (No model.)

*To all whom it may concern:*

Be it known that I, DUNCAN J. MCCALL, a citizen of the United States, residing at Cameron, in the county of Milam and State of Texas, have invented a new and Improved Combined Cultivator and Cotton and Corn Planter, of which the following is a specification.

My invention consists in certain novel features of construction and certain combinations of the same, as will be hereinafter set forth, and pointed out in the claims.

In the accompanying drawings, Figure 1 is a plan view of my improved implement as arranged for planting cotton-seed, cultivating the soil, and covering the seed. Fig. 2 is a side view of the same, with a portion of the frame broken away in order to expose parts which would be hid by the same. Fig. 3 is a vertical transverse section of Fig. 1, looking toward the rear. Fig. 4 is a broken detail and central longitudinal section. Fig. 5 is a similar view to Fig. 4, but showing a modification of the mode of hinging the furrow-opener and conducting-chutes. Fig. 6 is a broken detail side view of the double clevis adjusting device for the cultivator-beams. Fig. 7 is a transverse detail section, showing a modified construction whereby corn can be planted. Fig. 8 is a horizontal section of the hinged furrow-opener and conducting-chute and its bracing and adjusting devices. Fig. 9, Sheet 1, is a broken detail perspective view of one of the cultivator-beams with improved plow or shovel standard attached to it; and Fig. 10 is a detail front elevation of the main frame, plow-beams, double clevis device, connecting and supporting links, and the double-tree.

The frame A, as illustrated in the drawings, consists of cross-beams $a$ and longitudinal side beams, $a'$, which latter are united to beams $a^2$, which converge forwardly and form hounds, to which a pole or tongue, $a^3$, is connected. The side pieces, hounds, and tongue of this frame will preferably be formed separately and be bolted together. This frame is mounted upon propelling-wheels P on a suitable axle.

Beneath the front cross-beam the double-tree B is connected to the frame by a strong pin, $b$, and guided by loops $c$, which are pendent from said frame. To this double-tree oblong loop-shaped clevis devices $d$, having several adjusting-notches, are fastened, as shown in Figs. 2, 6, and 10, and to these clevis devices cultivator-plow beams C are connected by means of similar clevis devices, $d'$, on the front ends of the beams, and links $d^2$, as shown. In rear of the described clevis-connections short pivot-shafts D are provided upon the frame A, and to these shafts the pulley-like ends $e$ of levers E are fastened, and by means of chains $e'$ are connected to the pulley-like ends of the levers and to the cultivator-plow beams. By this means the cultivator-plow beams are connected to the frame A, and by means of the levers and chains the beams and plows can be adjusted as may be required.

Ratchets and pawls, as at $h$ $h'$, of suitable construction, may be employed in connection with the levers E, as shown, for retaining the plows at any altitude desired. The double clevis contrivance $d$ $d'$ brings the draft of the beam below the frame and tongue and admits of its being regulated as may be required in the cultivation of the soil. The respective plow-beams have their own suspending, raising and lowering, and adjusting devices, and each can be manipulated independently. It is desirable to have the cultivator-plow beams extend forward beneath the axle, as described and shown, inasmuch as this arrangement enables the power of the team to be applied nearer the load, while the double-tree, by being placed under the tongue, aligns the draft and the movement of the plow in a very direct manner, and my special construction and combination therewith of the double clevis contrivance will render such arrangement of the plow-beams and double-tree more convenient than prior combinations, which have thrown the line of draft below the tongue of the frame.

The cultivator-plow standards F are constructed with horizontally-extended arms $f$, which are provided with adjusting-holes $g$, and are made of dovetail shape and fit into dovetail mortises $f'$, cut transversely into the top of the plow-beams, as shown. By this construction the range of the plows on the two beams can be increased or decreased, and by setting one standard on the outside and another on the inside of a beam, as shown, the plow-cultivators can be moved farther apart or nearer together. By the angular bend in the standards a strong connection between the beams and the plow-cultivators can be secured, while the construction of the horizontal arms in dovetail form and fitting these arms in dovetail mortises avoids the use of any other fastening than suitable adjusting and confining pins passed through the holes $g$ into the beams.

In rear of the plows a seat, G, for the driver is mounted upon springs extending up from the frame A. This seat is located in proper relation to the levers E and pawls $h'$, and the driver may with his feet or hands release the pawls for the purpose of lowering the plows, or with his hands operate the levers to raise the plows.

Upon the frame A, between its side beams, and forward of the plow-cultivators, a hopper, G', for seed is rigidly applied in any suitable manner, as shown. The hopper represented in Figs. 1, 2, 3, 4, and 5 is designed for cotton-seed, and its adjuncts are constructed as follows: The hopper G' is of rectangular form horizontally, and its end and sides converge downward, and in its bottom an oblong opening, $i$, is provided. The bottom portion of the hopper is formed of a strong casting, $j$, with a seed-passage through it, and to this casting a seed-conducting chute, H, with a strong casting, I, for supporting a furrow-opening plow, I', is hinged, as shown at $k$, the hinge of the chute being transverse and to one side or central of the chute, as shown in the drawings.

In the seed-chamber of the hopper a revolving shaft, J, with curved stirring-arms $j'$, is applied, and within the chamber or passage of the bottom plate, $j$, a shaft, J', with shorter curved arms $j^2$, is provided. The arms $j'$ agitate and force the cotton-seed down into the chamber or passage of the plate $j$, while the shorter curved arms $j^2$ pull the seed down through the smallest part of the hopper and carry it down through the plate $j$ into the chute H, from whence it falls into the furrow made by the furrow-opener I'. The shaft J of the stirring-arms $j'$ has its bearings within the hopper and upon the frame A, as shown, and on the outer end of this shaft a spur-wheel, $l$, is provided, while on the shaft J', carrying the arms $j^2$, a similar spur-wheel, $m$, is applied. The shaft J' has its bearings in the bottom plate, $j$, of the hopper, as shown. The two spur-wheels are geared together, and are caused to revolve by means of pinions $n$ $n'$ on a shaft, $n^2$, said pinions being set in motion by means of a spur-wheel, M, which is on the hub or inner face of one of the propelling or supporting wheels P of the frame A, and made to gear with the pinion $n$, while the pinion $n'$ gears with the spur-wheel $l$, as shown. The armed stirrer-shaft J disintegrates the caked or matted cotton-seed, while the armed shaft J' prevents choking in the throat of the hopper.

If it is desired to plant corn, the hopper shown in Fig. 7 may be substituted for the one shown in Figs. 1, 2, 3, 4, and 5. This hopper has spring-boards $p$ $p$ on two of its sides, and is otherwise suitably constructed, as shown, to prevent the escape of the corn except as it is drawn out into the chute by the armed shaft J'.

If desired, a horizontal relief-diaphragm with holes large enough to permit corn to flow down upon the meeting ends of the boards $p$ $p$ may be applied in the hopper shown in Fig. 7. When this hopper is employed the stirrer-shaft J is not required, and the pinion $n'$ will be made to gear with the spur-wheels P and $m$ in any appropriate manner.

The chute or seed-conductor has strong bracing-bars N connected to its lower end by pivot-bolts $q$, and these bars extend back horizontally, or nearly so, and connect by a strong pin, $q'$, to a stout lever, R, which is pivoted to the frame A, as shown. The pin $q'$ plays in a vertical slot of the lever, and thus it can accommodate itself to the necessary adjustment given to the chute and furrow-opener, and also to the swinging movement of the chute on its hinge.

The lever above its pivot is provided with a stout pawl, $r$, and directly under this pawl a strong ratchet, $s$, is applied upon the frame. The pawl and ratchet, together with the bars and lever, firmly brace the chute and furrow-opener while in operation. By the combination of the hinged chute, bracing-bars, lever, and pawl and ratchet, the chute and furrow-opener can be held to their work, and whenever a stump or formidable obstruction which would endanger the breakage of the machine is encountered instant relief is at hand, it only being necessary for the operator to move the pawl either with his hand or foot, and thereby allow the chute, bracing-bars, and lower end of the lever to move backward and upward far enough to clear the obstruction or pass over the same, which having occurred, the parts can be readjusted by the lever and retained by the pawl and ratchet.

The special mechanical appliances which I have shown and described for rendering the chute and furrow-opener rigid, and for releasing the same at the will of the operator, are preferable to any of the automatic relief devices, as they are strong and durable, and are only operated when necessity requires. By my mode of constructing the seed-conductor of stout metal and providing it with a casting to support the furrow-opener, it is made strong enough to be used as one of the cultivator-plows for cultivating the soil preparatory to sowing the seed; and by providing this conductor with a hinge it can be turned up, if desired, while the cultivator-plows are being used for preparing the soil for seed, and during the planting operation the cultivator-plows can be set to cover the seed and further cultivate the soil between the drill-rows.

I am aware that plow-beams have been applied beneath the axle; also, that the doubletree has been arranged below the tongue; also, that cultivator-standards have been formed with horizontal branch arms; also, that seed-tubes have been hinged beneath a hopper; also, that brace-rods and a lever have been connected to hinged seed-tubes; and, also, that two armed shafts for controlling the feed of the seed from the hopper to the tube have been devised, and therefore I do not broadly claim any of the above-mentioned contrivances; but What I do claim as my invention, and desire to secure by Letters Patent, is—

1. The combination, with plow-cultivator beams C and the double-tree B, which are below the tongue $a^3$, of the double adjusting clevis devices $d\ d'\ d^2$, substantially as and for the purpose described.

2. The combination, with the plow-cultivator frame A, provided with dovetailed transverse mortises $f'$ in the top of its side beams, $a'\ a'$, of plow-standards F, provided with perforated adjustable horizontal arms $f$, through which confining-pins are passed into the beams, all substantially as and for the purpose herein described.

3. The strong casting $j$, formed with a chamber and with bearings, in combination with the hopper G′, tube H, hinged to the casting, arms $j^2$, arranged in the chamber of the casting $j$, shaft J′, carrying the arms and journaled in the bearings of the casting, shaft J, having arms $j'$, and the gear-wheels M $l\ m\ n\ n'$, all substantially in the manner herein described, and for the purpose set forth.

4. The combination, with the tube H, hinged to the casting $j$ of the hopper, and having a backward swinging movement, of the bracing-bars N, pivoted to the hinged tube, and connected by pin $q'$ and slot to the hand-lever R, which is provided with the pawl $r$, working in a ratchet, $s$, all substantially as and for the purpose described.

DUNCAN JEFFERSON McCALL.

Witnesses:
D. M. McCALL,
WM. WHISTLER.